United States Patent

Haruyama et al.

[11] Patent Number: 6,011,210
[45] Date of Patent: Jan. 4, 2000

[54] MUSICAL PERFORMANCE GUIDING DEVICE AND METHOD FOR MUSICAL INSTRUMENTS

[75] Inventors: Kazuo Haruyama; Atsushi Yamaura, both of Hamamatsu, Japan

[73] Assignee: Yamaha Corporation, Hamamatsu, Japan

[21] Appl. No.: 09/001,613

[22] Filed: Dec. 31, 1997

[30] Foreign Application Priority Data

Jan. 6, 1997 [JP] Japan ................................ 9-000116

[51] Int. Cl.[7] .................................................. G09B 15/00
[52] U.S. Cl. .................... 84/470 R; 84/478; 84/464 A
[58] Field of Search .......................... 84/453, 478, 479, 84/479 A, 482, 485 R, 464 A, 470 R, 477 R

[56] References Cited

U.S. PATENT DOCUMENTS

| | | | |
|---|---|---|---|
| 3,771,406 | 11/1973 | Wheelwright | 84/464 |
| 4,080,867 | 3/1978 | Ratanangsu | 84/477 R |
| 4,480,521 | 11/1984 | Schmoyer | 84/1.28 |
| 4,651,612 | 3/1987 | Matsumoto | 84/1.03 |
| 4,703,681 | 11/1987 | Okamoto | 84/478 |
| 4,730,533 | 3/1988 | Schoerkmayr | 84/478 |
| 5,214,231 | 5/1993 | Ernst et al. | 84/652 |
| 5,392,682 | 2/1995 | McCartney-Hoy | 84/470 R |
| 5,394,784 | 3/1995 | Pierce et al. | 84/464 A |
| 5,656,789 | 8/1997 | Nakada et al. | 84/477 R |
| 5,827,988 | 10/1998 | Wachi | 84/609 |

FOREIGN PATENT DOCUMENTS

| | | |
|---|---|---|
| 5-173546 | 7/1993 | Japan . |
| 6-75568 | 3/1994 | Japan . |
| 8-292276 | 11/1996 | Japan . |
| 2254954 | 10/1992 | United Kingdom . |

*Primary Examiner*—Robert E. Nappi
*Assistant Examiner*—Wesley Scott Ashton
*Attorney, Agent, or Firm*—Graham & James LLP

[57] ABSTRACT

In performance data storing tracks, there are stored, in a mixed condition, actual performance data including pairs of pitch data designating a pitch of a tone to be performed and volume data of audible level designating a volume of the tone and fake performance data including pairs of pitch data designating a pitch of a predetermined performance tone and tone volume controlling data of non-audible level and fake performance data including pairs of pitch data designating a pitch of a predetermined performance tone and volume controlling data of non-audible level. Besides, the fake performance data for the predetermined performance tone is stored so as to be read out in advance of the actual data for the performance tone. The read-out fake performance data can be identified from the non-audible level of its volume designating data. In response to the fake performance data, a predetermined preliminary indication is made for preannouncing a key or other performance operating member to be operated. In generating automatic performance tones in response to the data from the tracks, only performance tones based on the actual performance data are actually sounded with no interference by tones based on the fake performance data, because the volume of the fake performance data is at the non-audible level. Thus, without requiring any extra control, the fake performance data can be used for the guiding purposes, causing no interference in automatic performance.

25 Claims, 9 Drawing Sheets

MUSICAL PERFORMANCE GUIDING DEVICE AND METHOD FOR MUSICAL INSTRUMENTS

BACKGROUND OF THE INVENTION

The present invention relates musical performance guiding devices and methods and recording media recording thereon a musical performance guiding program and data.

In recent years, keyboard-type electronic musical instruments have been in practical use which are equipped with a performance or key depression guiding function to sequentially indicate each key to be depressed in such a manner that even a beginner-class player can play music well according to the indicated key. Most ordinary form of the key depression guiding function is by turning on or lighting a LED (Light Emitting Diode) associated with each key to be depressed at predetermined key depression (key-on) timing. More sophisticated form of the key depression guiding function is by lighting a LED associated with each key to be depressed in a first or preliminary display mode in advance of its predetermined key-on timing and then relighting the LED in a second display mode upon arrival at the key-on timing, as typically known from U.S. Pat. No. 4,703,681.

Some of the known key depression guiding devices, including the one disclosed in the above-referenced U.S. patent, are designed to carry out the preliminary or preannouncing LED lighting by a scheme of reading out preannouncing data stored in different tracks from those for tone generating or performance data which are used also as actual key-depression timing indicating data, or by another scheme of pre-reading tone generating data in advance of their actual readout timing.

However, the first-said preannouncing LED lighting scheme based on the preannouncing data stored separately from the tone generating data is disadvantageous in that extra tracks are necessary for storage of the preannouncing data, considerably reducing the number of the tracks available for the tone generating data. The second preannouncing LED lighting scheme based on the pre-reading of the tone generating data is also disadvantageous in that extra operations are necessary for pre-reading the tone generating data in addition to the operations for reading these data at their actual readout timing, making the operations very complex as a whole. Further, because the tone generating data must be prestored within the device in order to permit the pre-reading of the tone generating data, the second preannouncing LED lighting scheme would not work in applications where the tone generating data are supplied from an external device on a real-tome basis.

SUMMARY OF THE INVENTION

It is therefore an object of the present invention to provide a musical performance guiding device and method which can achieve a performance guide in various desired forms without requiring any extra operation such as pre-reading of performance data, as well as a recording medium storing a program and data for such a performance guide.

According to one aspect of the present invention, there is provided a musical performance guiding device for making a visual indication as a guide for musical performance operation by a human player on the basis of note data including tone pitch designating data and tone volume controlling data, which comprises an indication mode control that performs control such that the visual indication is made in a first mode when the tone volume controlling data included in the note data is of a value equal to or smaller than a predetermined value but is made in a second mode when the tone volume controlling data is of a value greater than the predetermined value.

By thus differentiating the mode of the performance guiding indication depending on the value of the tone controlling data, it is possible to facilitate the control for differentiating the guiding indication corresponding to actual performance timing and preliminary guiding indication preceding the actual-timing guiding indication. Namely, for note data corresponding to an actual performance, the tone volume controlling data is set to a value greater than the above-mentioned predetermined value (which may of course be an audible-level value) and the performance guiding indication is made in the second mode. On the other hand, for note data corresponding to the preliminary performance guiding indication preceding actual performance timing (this data will be called preannouncing or preliminary note data or fake note data), the tone volume controlling data is set to a value equal to or smaller than the predetermined value above-mentioned predetermined value and the performance guiding indication is made in the first mode. This way, when the performance guiding indication is in the first mode, the player can know that it is the time to make preparations for performance operation therefor; when the performance guiding indication is in the second mode, the player can know that it is the time to actually execute the performance operation therefor.

The actual note data and preliminary note data (or fake note data) can be stored in a same track in a mixed condition, because, from the value of the tone volume controlling data, it is possible to readily determine whether the performance data is actual note data or preliminary (fake) note data. Also, in a situation where performance tones based on the performance data are automatically generated for use in the player's performance practice, it is possible to prevent tones, corresponding to the preliminary (fake) note data, from being substantially heard by the player and hence from undesirably interfering with the player's performance, through a very simple form of control.

According to another aspect of the present invention, there is provided a musical performance guiding device for making a visual indication as a guide for musical performance operation by a human player on the basis of note data including tone pitch designating data and tone volume controlling data, which comprises an indication mode control that divides values of the tone volume controlling data not greater than a predetermined value into a plurality of value groups and changes a mode of the visual indication depending on which of the value groups the tone volume controlling data included in the note data belongs to. With this arrangement, the mode of the preliminary performance guiding indication preceding actual performance timing can be changed in various desired manners.

According to still another aspect of the present invention, there is provided a musical performance guiding device which comprises: a performance data supplying unit that supplies performance data including pairs of tone pitch designating data and tone volume controlling data; an indicating unit that, on the basis of the performance data supplied via the performance data supplying unit, makes a performance guiding indication indicative of a pitch designated by the tone pitch designating data; an information inputting unit that receives guide mode setting information for setting an optional guide mode from among a plurality of guide modes; and an indication mode control that changes a mode of the performance guiding visual indication in accordance with a combination of the guide mode set by the guide mode setting information and a value of the tone volume controlling data included in the supplied performance data. With this arrangement, the mode of the preliminary performance guiding indication preceding actual performance timing can be variably controlled in various desired manners by selecting or setting a desired one of the guide modes.

It is also important to note that the inventive concepts of the present invention as will be detailed hereinbelow can be embodied as not only a device but also a method. The present invention can also be embodied in the form of a computer program and a recording medium storing thereon such a computer program. Furthermore, the present invention can be practiced in the form of a recording medium which stores thereon performance data of a desired music piece on the basis of novel and unique ideas of the invention.

BRIEF DESCRIPTION OF THE DRAWINGS

For better understanding of the above and other features of the present invention, the preferred embodiments of the invention will be described in greater detail below with reference to the accompanying drawings, in which.

DETAILED DESCRIPTION OF THE PREFERRED EMBODIMENTS

Figure 1:
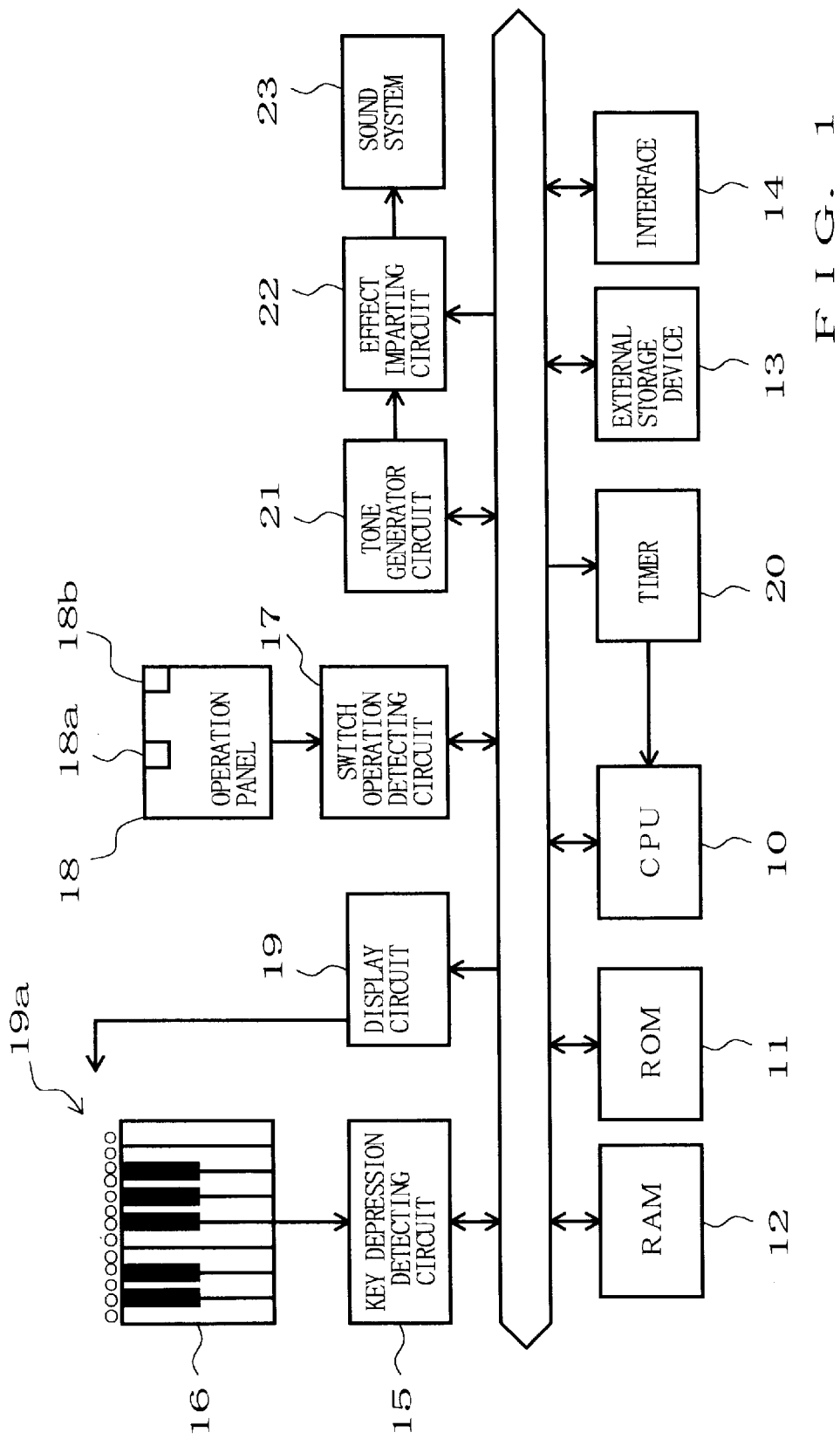
FIG. 1 is a block diagram of a keyboard-type electronic musical instrument according to a preferred embodiment of the present invention.

FIG. 1 is a block diagram of a keyboard-type electronic musical instrument according to a preferred embodiment of the present invention, which is capable of not only executing a normal musical performance in response to player's manual operation on the keyboard 16 but also executing an automatic performance of a selected music piece by inputting thereto a performance data set from an external device or by reading a performance data set from an external storage device. The keyboard-type electronic musical instrument also has a to-be-depressed key indicating function which lights any of LEDs (Light Emitting Diodes) 19a, provided on a rear panel of the keyboard 16 in corresponding relation to individual keys thereof, in order to visually indicate specific keys to be depressed by the player so that the player can be assisted by the sequentially lit LEDs in operating the keyboard in accordance with a selected music piece.

The keyboard-type electronic instrument includes a CPU 10 that control overall operation of the musical instrument. To the CPU 10 are connected a ROM 11, a RAM 12, an external storage device 13, an interface 14, key depression detecting circuit 15, switch operation detecting circuit 17, a display device 19, a timer 20, a tone generator circuit 21, an effect imparting circuit 22 and a sound system 23. The timer 20 is connected to an interrupt input terminal of the CPU 10 and functions to control an automatic performance tempo. The external storage device 13 may be any suitable external storage device such as a hard disk device, a floppy disk drive, a CD-ROM drive or a MO (Magneto-Optical Disk) drive. The interface 14 may also be any suitable interface such as a MIDI interface or a communication interface coupled with an external computer.

In the keyboard-type electronic musical instrument according to the present embodiment, control programs are prestored in the ROM 11. Alternatively, the control programs may be prestored in a hard disk device, in which case, by just loading the programs into the RAM 12, the CPU 10 can operate in exactly the same way as where the control programs are stored in the ROM 11. This alternative arrangement will greatly facilitate version-up of the control programs, addition of a new control program or the like.

Where a CD-ROM drive is employed as the external storage device 13, it reads out any of the control programs and various data from a CD-ROM installed therein and the read-out control program and data are then stored into a hard disk device. This alternative arrangement will also greatly facilitate version-up of the control programs, addition of a new control program or the like.

The communication interface is connected to a communication network, such as a LAN (local area network), Internet and telephone line network, so that it is connected with a server computer via the communication network. Where the control programs and various data are not stored in a hard disk device, this communication interface is used to download them from the server computer. In such a case, the keyboard-type electronic musical instrument, functioning as a "client", sends a command requesting the server computer to download a desired program and data by way of the communication interface and communication network. In response to the command, the server computer delivers the requested control program and data to the electronic keyboard instrument via the communication network, and the musical instrument, in turn, receives and stores the control program and data into the hard disk device, which completes the required downloading.

As further shown in FIG. 1, the keyboard 16 is connected to the key depression detecting circuit 15 and may be of the type having 61 keys (C1–C6), 76 keys (E0–G6) or 88 keys (A-1–C7). In corresponding relation to the keys on the keyboard 16, 61, 76 or 88 LEDs 19a are provided adjacent to the keys. Switches on an operation panel 18 are connected to the switch operation detecting circuit 17 and include a play/stop switch 18a, guide mode switch 18b, etc. The display circuit 19 controls the on/off operation of the LEDs 19a and includes a display for visually indicating a currently selected mode, tone color, etc. The tone generator circuit 21 is connected to the effect imparting circuit 22, which is in turn connected to the sound system 23.

When one of the keys is depressed on the keyboard 16, the key depression detecting circuit 15 detects this key-on event and output a key-on signal to the CPU 10. The CPU 10 transmits tone generation event data to the tone generator circuit 21, so that the circuit 21 generates a tone signal on the basis of the key-on signal and passes the thus-generated tone signal to the effect imparting circuit 22. The effect imparting circuit 22 functions to impart a tonal effect, such as reverberation or echo, to the tone signal, and a type, depth, etc. of the effect to be imparted are set by parameters given from the CPU 10. The tone signal having a tonal effect imparted thereto by the effect imparting circuit 22 is then output to the sound system 23, which audibly reproduces or sounds the tone signal after amplification and D/A conversion.

Activation of the play/stop switch 18a starts an automatic performance based on data of a selected music piece. Then, once the play/stop switch 18a is activated again, the automatic performance is stopped. The automatic performance may be executed on the basis of a performance data set that is received in real time via the interface 14 from an external device, or by reading out a performance data set stored in the external storage device 13 attached to the musical instrument.

Once the guide mode switch 18b is activated during such an automatic performance, the electronic musical instrument is placed in a guide mode to initiate a key depression guiding function. The key depression guiding function sequentially turns on and off the LEDs 19a on the keyboard 16 in accordance with the progression of the automatic performance in order to instruct the player which of the keys should be depressed. The key depression guiding function is normally executed for those of the keys that are used for performing a melody. The LED associated with each key to be depressed shortly is preliminarily lit in a first display mode at predetermined timing before its actual key-on timing (this form will also be called "preannouncing lighting") and then lit in second display mode upon arrival of the predetermined key-on timing (this form will also be called "timing-arrival indicating lighting"). By the lighting of the LED in the first display mode, the player can know that the predetermined key-on timing of the key will come pretty shortly. In the present embodiment, the first display mode is continuous lighting of the specific key to be depressed shortly, while the second display mode is intermittent lighting, i.e., blinking thereof (e.g., at intervals of several hundred msec.). As will be later described in FIGS. 3A and 3B, the above-mentioned first or preannouncing lighting may be carried out by continuously lighting a LED from actual release of a last-depressed key up to predetermined key-on timing of the corresponding key ("note-by-note display" in FIG. 3A) or by lighting together all LEDs associated with particular keys to be depressed within a next phrase to preliminarily announce the particular keys ("phrase-by-phrase display" in FIG. 3B), other than by lighting the LED associated with each key to be depressed shortly at predetermined timing before its actual key-on timing. Alternatively, the first display mode and second display mode may be reversed; that is, the second display mode may be continuous lighting, while the first display mode may be blinking.

Figure 2:
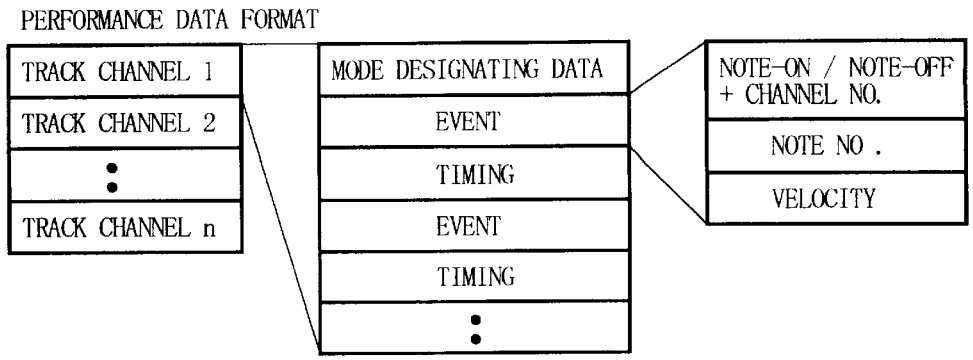
FIG. 2 is a diagram illustratively showing a format of a performance data set used in the embodiment of FIG. 1.

FIG. 2 is a diagram illustratively showing a format of a performance data set used in the keyboard-type electronic musical instrument. As noted earlier, the performance data set is supplied from an external device via the interface 14 or prestored in the external storage device 13. The performance data set comprises a plurality of tracks, each of which includes event data and timing data indicative of timing to read out the event data. The event data include note-on event data, note-off event data, system-exclusive data, etc. The note-on event data, which instructs start of tone generation, includes a code indicating that this is note-on event data, MIDI channel number, note number and velocity data. The note-off event data, which instructs termination of tone generation, includes a code indicating that this is note-off event data, MIDI channel number, note number and velocity data. The note number is a numeral value in the range of 0–127, and where the keyboard has 61 keys, the key depression guiding function is performed for key 36(C1) to key 96(C6). The velocity data is a parameter used primarily to control a volume level of a tone signal to be generated. In the case of the keyboard-type electronic musical instrument, the velocity data is generated in accordance with a detected key depression speed and used by the tone generator circuit to effect volume and filtering control of a tone. The filtering control is to control levels of harmonic components of the tone.

The system-exclusive message is used when information other than the performance information is transferred in the MIDI format; more specifically, the system-exclusive message is used to control the on/off of the key depression guiding function or the guiding levels, from an external device or for each performance data set read out from the external storage device 13.

The performance data set may be in any desired format such as: the "event plus relative time" format where an occurrence time of a performance event is expressed by an elapsed time from a preceding event; the "event plus absolute time" format where an occurrence time of a performance event is expressed by an absolute time within a music piece or measure; the "pitch (rest) plus note length" format where performance data set is expressed by a combination of pitch and length of a note or by a combination of rest and its length; and the so-called "solid" format where a memory location is allocated for every minimum resolution unit of a performance and each performance event is stored at one of the memory locations corresponding to an occurrence time of the event. Automatic performance data set may comprise data of a plurality of channels in a mixed condition rather than the illustrated form of FIG. 2 where the data of each channel are stored in a separate track.

Figure 3A:
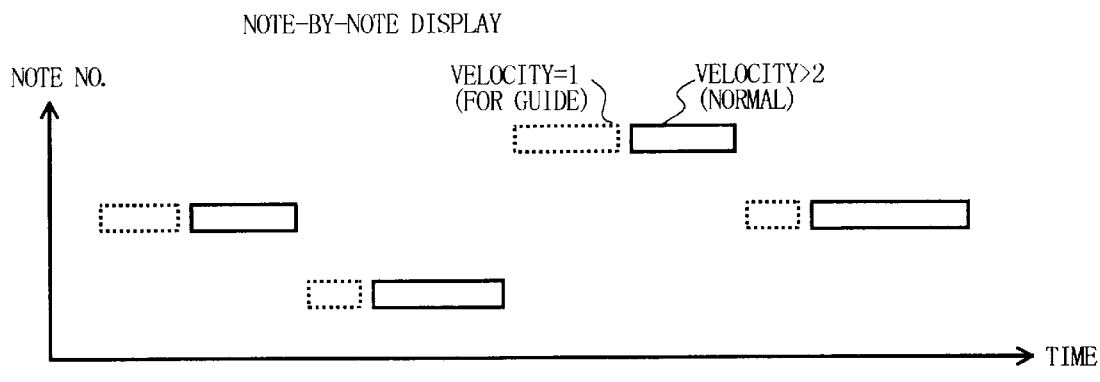
FIGS. 3A and 3B are diagrams showing the performance data along the time axis.
Figure 3B:
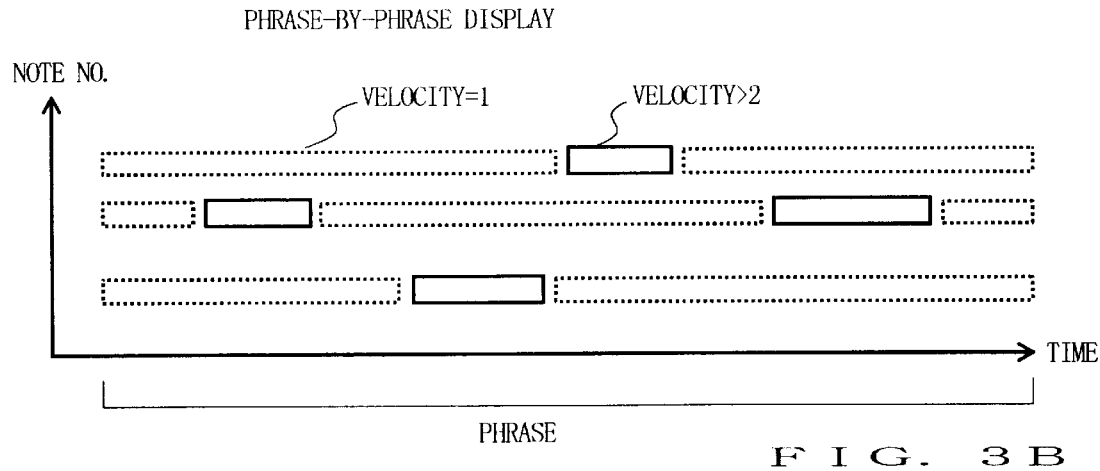

FIGS. 3A and 3B are diagrams showing the performance data, used in the electronic musical instrument, as developed along the time axis, where each dotted-line block represents a note-on section of velocity value "1" and each solid-line block represents a note-on section of velocity value "2" or more. The note-on section represents a time period from note-on event data to corresponding note-off event data. In an automatic performance, note data are supplied to the tone generator circuit 21, but tone signals generated by the tone generator circuit 21 will fail to reach the audible level if the velocity value is very small like "1" or "2". For convenience of description, assume that a small velocity value, such as "1", "2", or any other values below "10" are regarded as non-audible level. Thus, only note data of relatively great velocity will result in generation of tone signals that can be actually heard as automatic performance tones. A boundary between the audible and non-audible levels may vary from one listener to another and can not be determined definitely; however, in general, velocity values smaller than "10" may be considered as non audible levels.

Therefore, in the present keyboard-type electronic musical instrument, note data of velocity value "1" (hereinafter called velocity "1" note data) is used as data for preannouncing lighting in the key depression guiding mode. Namely, at predetermined timing before readout timing of note data to be actually sounded (i.e., note data of velocity value greater than "1" and this note data will hereinafter be referred to as actual note data), velocity "1" note data of the same note number as that of the actual note data is written for the preannouncing lighting purpose, so that the LED for the key corresponding to the note number is preliminarily lit, in response to the velocity "1" note data, in the first display mode to preannounce approaching key-on timing of the key. Then, upon arrival of the readout timing of the actual note data, the LED is lit in the second display mode. By thus employing the different display modes for the preannouncing lighting and the timing-arrival indicating lighting, the player can visually recognize whether he is approaching the key-on timing or has just arrived at the key-on timing.

FIG. 3A shows an example of the performance data arranged to display a note upon termination of visual indication of a preceding note. Specifically, in the example of FIG. 3A, velocity "1" note data preannouncing a key to be next depressed is embedded at the end (immediately after note-off timing) of each actual note data so that the LED associated with the to-be-next-depressed key is lit upon completion of generation of the preceding tone (note-by-note display). FIG. 3B shows another example of the performance data set where a music piece is divided phrase by phrase and which is arranged to light together all the LEDs associated with particular keys to be depressed within a next phrase so as to preliminarily announce the particular keys on the phrase-by-phrase basis (phrase-by-phrase). Specifically, in the example of FIG. 3B, for each of the divided phrases, velocity "1" note data of same note numbers as those of all note data to be actually sounded within the phrase are written throughout an entire length (from the start to end of) the phrase; thus, the LEDs associated with all the keys to be depressed within the phrase are preliminarily lit at the beginning of the phrase. With such preannouncing lighting, the player can know in advance where his or her hands are to be placed for manual performance of the phrase. Whereas the example of FIG. 3B is shown as continuing the preannouncing LED lighting even after the end of the sounding (i.e., the end of the actually-sounded note-on section), such preannouncing LED lighting may be terminated after the end of the sounding.

In the case of the performance data set of FIG. 3A, arrangements have to be made such that note-on or note-off events do not occur in succession, because preannouncing lighting of each note must take place during sounding of a preceding note. Thus, where there is used a performance data set causing note-on or note-off events to occur in succession, it is only necessary that a device supplying event data (external device) or a device receiving event data (keyboard-type electronic musical instrument) process the performance data set to eliminate the succession of the note-on or note-off events. For example, when two note-on event data have been received or read out in succession, it is sufficient that note-off event data corresponding to the first note-on event data be compulsorily generated prior to the second note-on event data. This can be done by prestoring note-on and note-off conditions for each note. Further, for each note-on event of velocity value "1", the corresponding note-off event may also be set to velocity value "1".

As another alternative, velocity "1" note data may be embedded at a predetermined point (e.g., at a quarter-note length) before actual note data), and the time length of the preannouncing lighting may be set optionally as desired by the user.

Figure 4:
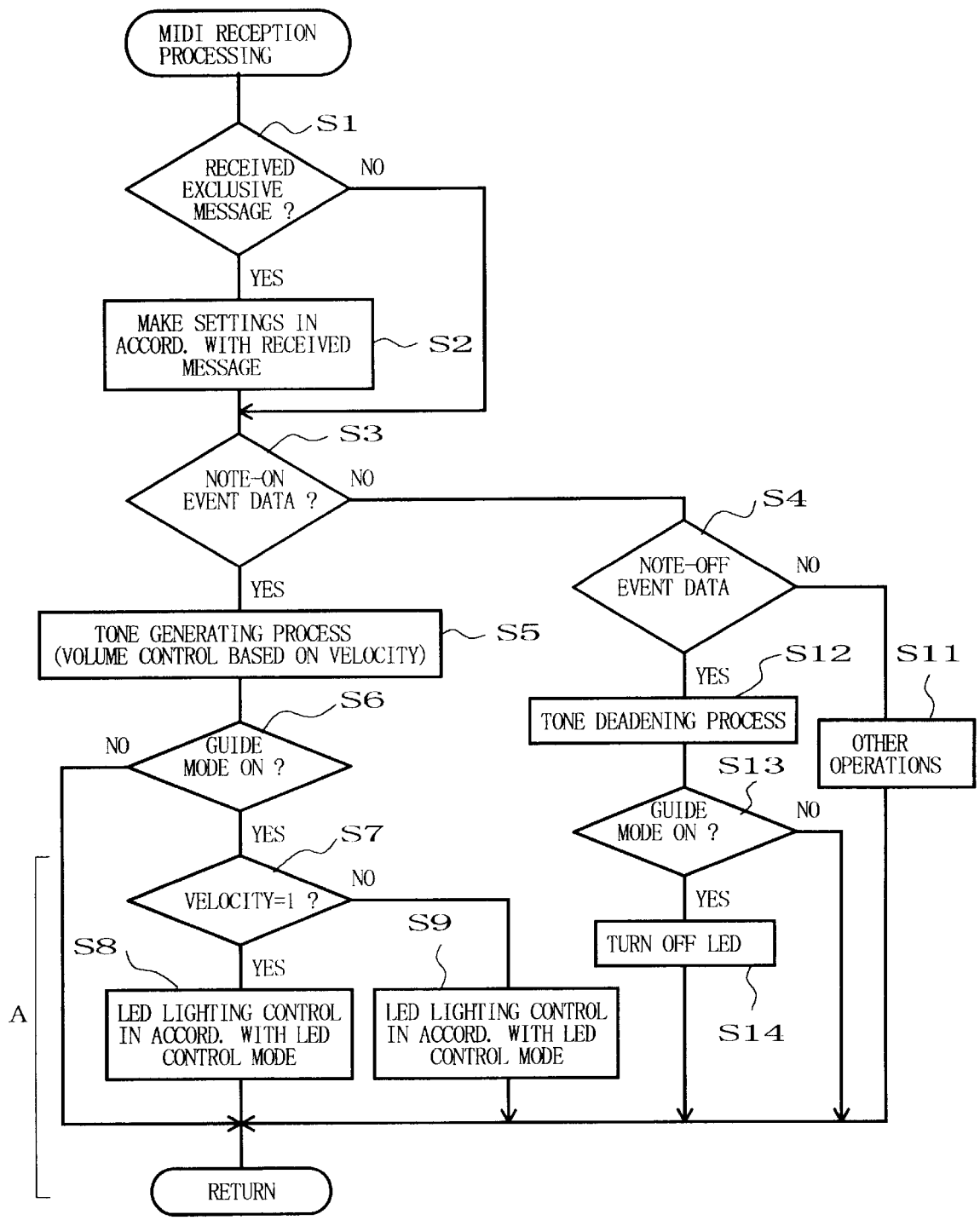
FIG. 4 is a flowchart showing an example of MIDI reception processing carried out in the embodiment of FIG. 1.

FIG. 4 is a flowchart showing an example of MIDI reception processing carried out in the embodiment of FIG. 1. This MIDI reception processing is part of an automatic performance program which is triggered when MIDI data as performance data is received via the interface from an external device or performance data is read out for an automatic performance from the external storage device, RAM or ROM of the electronic musical instrument.

In the MIDI reception processing, a determination is first made at step Si as to whether the received data is a system-exclusive message. If the received data is a system-exclusive message (YES), a predetermined operation is executed to make necessary settings in accordance with contents of the message at next step S2. By receiving from the external device such a system-exclusive message that also contains data to change settings of the key depression guiding mode, the on/off condition of the key depression guiding mode can be controlled from the external device.

If the received data is not a system-exclusive message as determined at step S1, it is further determined whether the received data is note-on event data (step S3) or note-off event data (step S4). If the received data is note-on event data as determined at step S3, a tone generating process is carried out at step S5 in accordance with contents of the note-on event data; however, if the note-on event data is of very small velocity value such as "1", no tone signal of audible level is generated so that no audible tone is produced. Note that arrangements may be made to not execute the tone generating process at all for note-on event data of very small velocity value such as "1", in order to reduce the load on the tone generator circuit.

After that, a determination is made at step S6 as to whether the key depression guiding mode is currently on. If so, it is further determined at step S7 whether the velocity value of the note-on event data is "1" or not. If the velocity value is "1", one or more predetermined LEDs 19a are preliminarily lit at step S8 in the first display mode, depending on a current LED control mode, for preannouncing the key to be depressed shortly. If the velocity value of the note-on event data is greater than "1" ($\geq 2$), one or more predetermined LEDs 19a are lit at step S9 in the second display mode, depending on the current LED control mode, for indicating arrival of the key-on timing. When the LED control mode is "1", the first-mode display or preannouncing lighting is conducted by continuous lighting, while the second-mode display or timing-arrival indicating lighting is conducted by blinking. When the LED control mode is "2", however, the preannouncing lighting is conducted by blinking, while the timing-arrival indicating lighting is conducted by continuous lighting. By selection of the LED control mode, the player can take advantage of the preannouncing lighting and timing-arrival indicating lighting in desired display modes. Note that if the key depression guiding mode is OFF as determined at step S6, the MIDI reception processing comes to an end directly from step S6.

If the received MIDI data is note-off event data (note-off message) as determined at step S4, a tone deadening process is executed at step S12 to silence a tone designated by the message, and then it is determined at step S13 whether the key depression guiding mode is ON. If the key depression guiding mode is ON, an operation is executed at step S14 to turn off the LED 19a corresponding to the note number of the note-off event data. Further, if the received MIDI data is other than note-on and note-off event data, such as program change data to change a tone color, other operations corresponding to the data are performed at step S11, and then the MIDI reception processing is terminated.

By carrying out the above-mentioned MIDI reception processing of FIG. 4 in response to reception of the performance data set of FIG. 3, the LED 19a corresponding to the designated tone pitch is preliminarily lit in the first display mode at predetermined timing before the actual key-on timing and then lit in the second display mode upon arrival of the key-on timing.

Figure 5A:
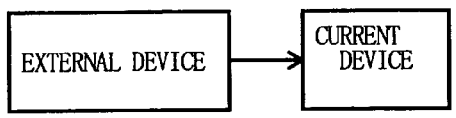
FIG. 5A is a block diagram showing relationship between the keyboard-type electronic musical instrument and an external device transmitting performance data to the electronic musical instrument.

As described above, the keyboard-type electronic musical instrument is capable of executing an automatic performance by receiving the performance data set from the external device in real time and carrying out the operations of FIG. 4. In this case, the electronic musical instrument is connected with the external device via a MIDI cable, as schematically shown in FIG. 5A, to receive the performance data set including a system-exclusive message. The external device transmits the performance data set to the electronic musical instrument through operations as shown in FIG. 5B.

Figure 5B:
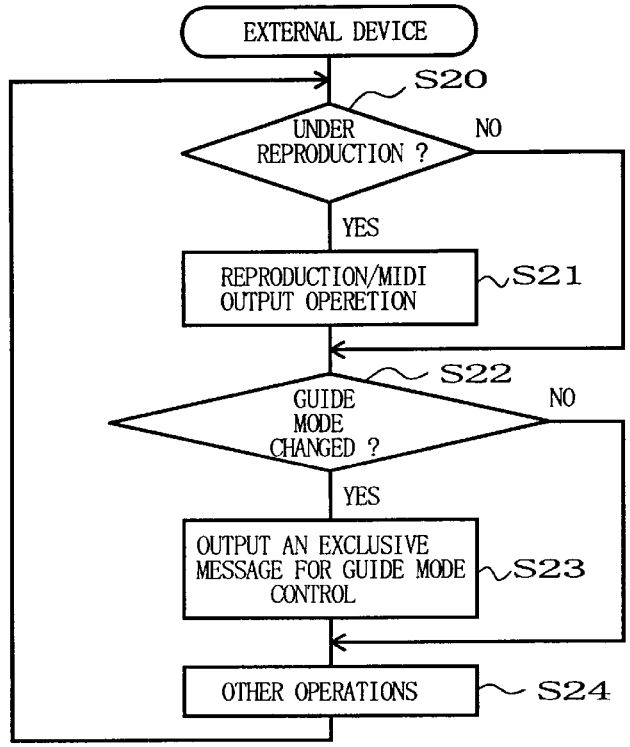
FIG. 5B is a flowchart showing an example of a process performed by the external device of FIG. 5A.

In FIG. 5B, a determination is made at step S20 as to whether the external storage device is in the process of an automatic performance, i.e., audibly reproducing the performance data set. If answered in the affirmative, control proceeds to step S21 to execute a reproduction/MIDI output operation. The reproduction/MIDI output operation reads out the performance data set stored in the external device at a predetermined tempo, and when event data is read out, it supplies the read-out event data, as MIDI data, to the electronic musical instrument.

After that, it is determined at step S22 whether there is any change in the the key depression guiding mode. Such a change in the key depression guiding mode can be made, for example, via a guide mode switch provided on the external device. When a change has been detected in the key depression guiding mode, control proceeds to step S23 to form a system-exclusive message instructing a change in the on/off condition of the guiding mode itself or a change in the LED control mode and to output the message to the electronic musical instrument. Then, other necessary operations are performed at step S24, which include starting or ending of the reproduction.

Through the above-mentioned operations, the performance data set can be supplied from the external device to the keyboard-type electronic musical instrument functioning as an automatic performance device. Also, any of the settings in the key depression guiding mode in the musical instrument can be changed by the external device transmitting a system-exclusive message to the keyboard-type electronic musical instrument.

Whereas the flowchart of FIG. 5B is shown and described here as changing the key depression guiding mode via the user's operation of the guide mode switch, a system-exclusive message instructing a change in the mode may be embedded in the performance data set so that the message is transmitted to the musical instrument as the performance data set is sequentially read out.

Further, whereas the preferred embodiment has been described above as using velocity "1" note data as the preliminary or preannouncing note-on data, other note data may be used as the preannouncing note-on data as long as it is of velocity value small enough to not produce a tone of substantially audible level. In this case, more complex control is enabled as by varying the form of the LED lighting in accordance with the velocity value.

Figure 6:
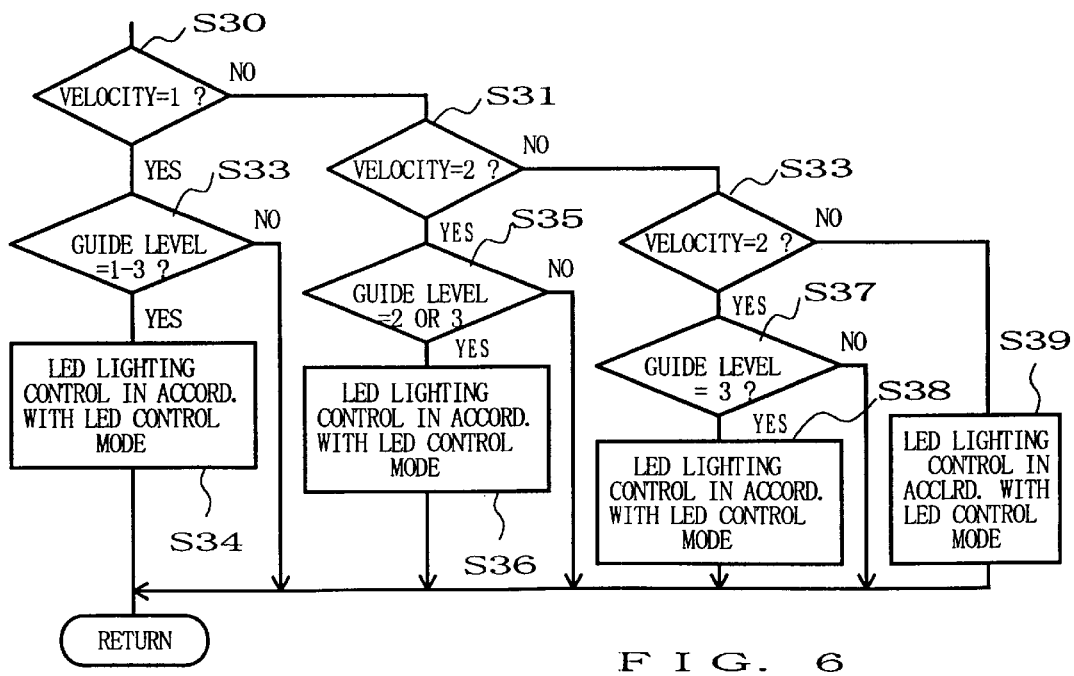
FIG. 6 is a flowchart showing a modification of the MIDI reception processing of FIG. 4.

FIG. 6 is a flowchart showing a modification of the MIDI reception processing, where velocity values "1", "2" and "3" are used for different LED control and which is executed in place of steps S7 to S9 of FIG. 4.

In FIGS. 4 and 6, if note-on event data has been received as determined at step S3 and the key depression guiding function is "ON" as determined at step S6, a determination is made at any of steps s30 to S32 as to whether the velocity value of the received note-on event data is "1", "2", "3" or more. If the velocity value is "1" as determined at step S30, the LED corresponding to the note number of the received note-on event data is lit in the first display mode at step S34 as long as the guiding level is determined at step S33 as being in the range of "1" to "3". If the velocity value is "2" as determined at step S31, the LED corresponding to the note number of the received note-on event data is lit in the first display mode at step S36 as long as the guiding level is determined at step S35 as being "2" or "3". If the velocity value is "3" as determined at step S32, the corresponding LED is lit in the first display mode at step S38 only when the guiding level is determined at step S37 as being "3". If the velocity value is more than "3", it means that the received note-on event data is actual note data and thus the corresponding LED is lit in the second display mode at step S39.

Now, consider a case where the modified embodiment is applied to a music piece of quadruple time and where preannouncing note-on data of velocity value "1" is written for the first beat note within each measure, preannouncing note-on data of velocity value "2" is written for the third beat note and preannouncing note-on data of velocity value "3" is written for each of the other notes through the abovementioned operations. In this case, when the guiding level is "1", key-on timing of only one key corresponding to the first beat in each measure is preannounced by lighting of the associated LED; when the guiding level is "2", key-on timing of two keys corresponding to the first and third beats in each measure is preannounced by lighting of the associated LEDs; and when the guiding level is "3", key-on timing of keys corresponding to all the notes is preannounced by lighting of the associated LEDs. Thus, for ultra-beginner-class players who will be satisfied with being able to play, say, only one note per measure to an automatic performance, guiding level 1 may be selected for the key depression guide, and for average-beginner-class players who want to play all notes to an automatic performance, guiding level 3 may be selected so that the LEDs 19a corresponding to all the notes are preliminarily lit for the key depression guide. However, if desired, intermediate-class players, who can properly play all notes with the key depression guide of, say, only one note per measure, may of course practice with guiding level 1.

In this modified embodiment as well, a change in the guiding level may be effected via the external device by transmitting a system-exclusive message instructing a change in the settings of the guide mode.

Whereas the modified embodiment has been described as associating the velocity values with different guiding levels, the velocity values may be associated with different forms of the key depression guide, such as visual indication of a next note, all notes within a phrase or a plurality of notes covered by player's fingers when the player puts his or her hand over the keyboard to sound a designated note. Alternatively, two or more velocity values may be associated with the player's respective fingers so that suitable fingering is displayed depending on the designated velocity values, or switching between visual indications for right and left hands may be effected depending on the velocity values. In each of these case, note data of difference velocity values are embedded in the performance data set in association with the selected form of the key depression guide.

The first and second display modes are not necessarily limited to the continuous lighting and short-interval blinking as described above and may be achieved by differentiating the brightness of the lighted LEDs through duty cycle control or the like. If dual-color LEDs are employed, the first and second display modes may be provided by changing the lighting color.

The visual display means for the key depression guide may be an LCD (Liquid Crystal Display) or external display other than the above-described LEDs, in which case a picture of a keyboard may be electronically shown on the display and the detailed form of display may be controlled on the basis of note event data of small velocity value.

Further, the performance data set has been described above as being stored in a recording medium and including preannouncing note-on data of velocity value "1" (in the FIG. 6 embodiment, velocity values "1", "2" and "3") are written together with actual note-on data as represented by dotted line blocks in FIG. 3. In an alternative, a performance data set including only actual note-on data may be read in and preannouncing note-on data may be automatically generated to provide the key depression guide.

Figure 7A:
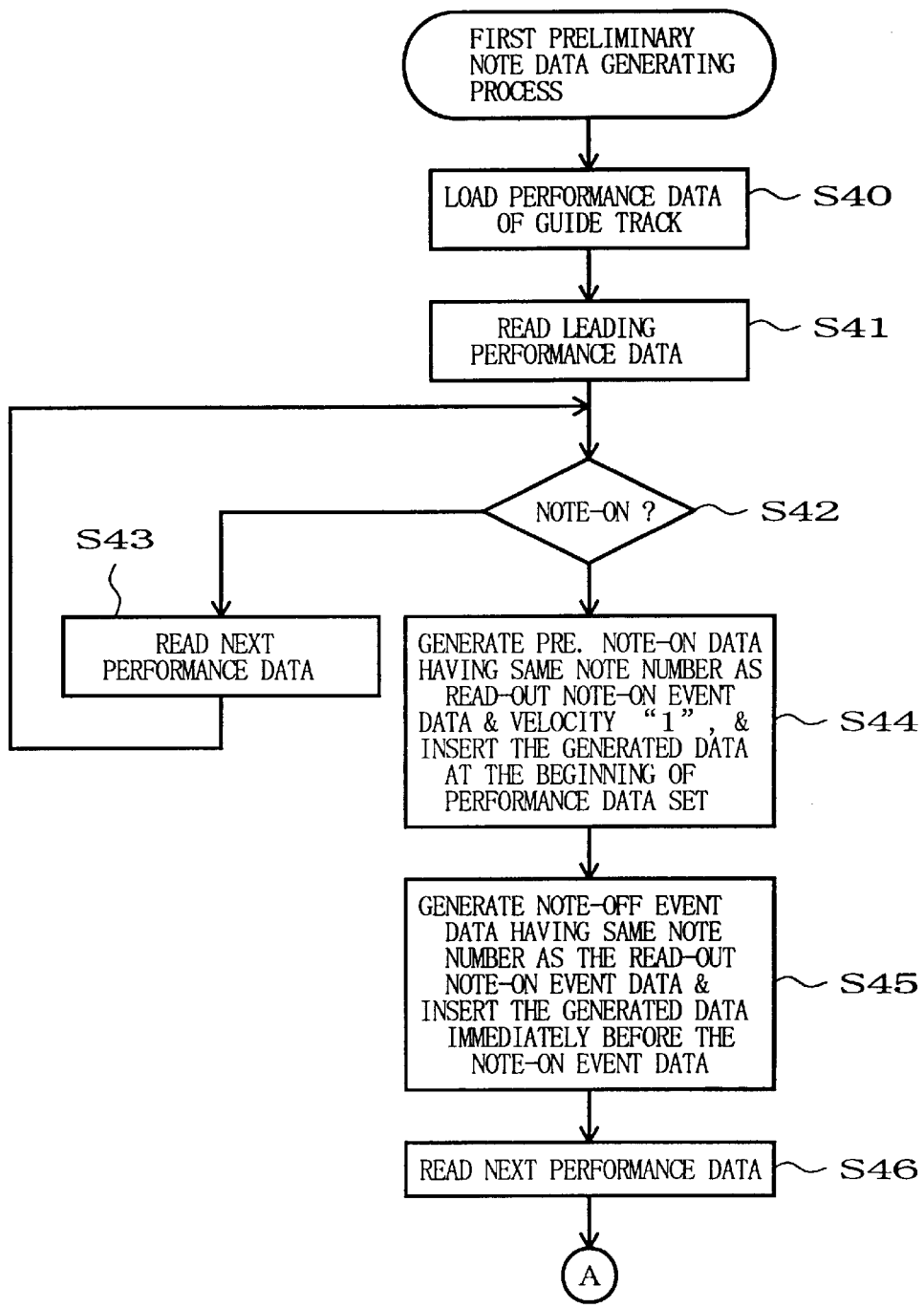
FIGS. 7A and 7B are portions of a flowchart showing an example of a preliminary note data generating process.
Figure 7B:
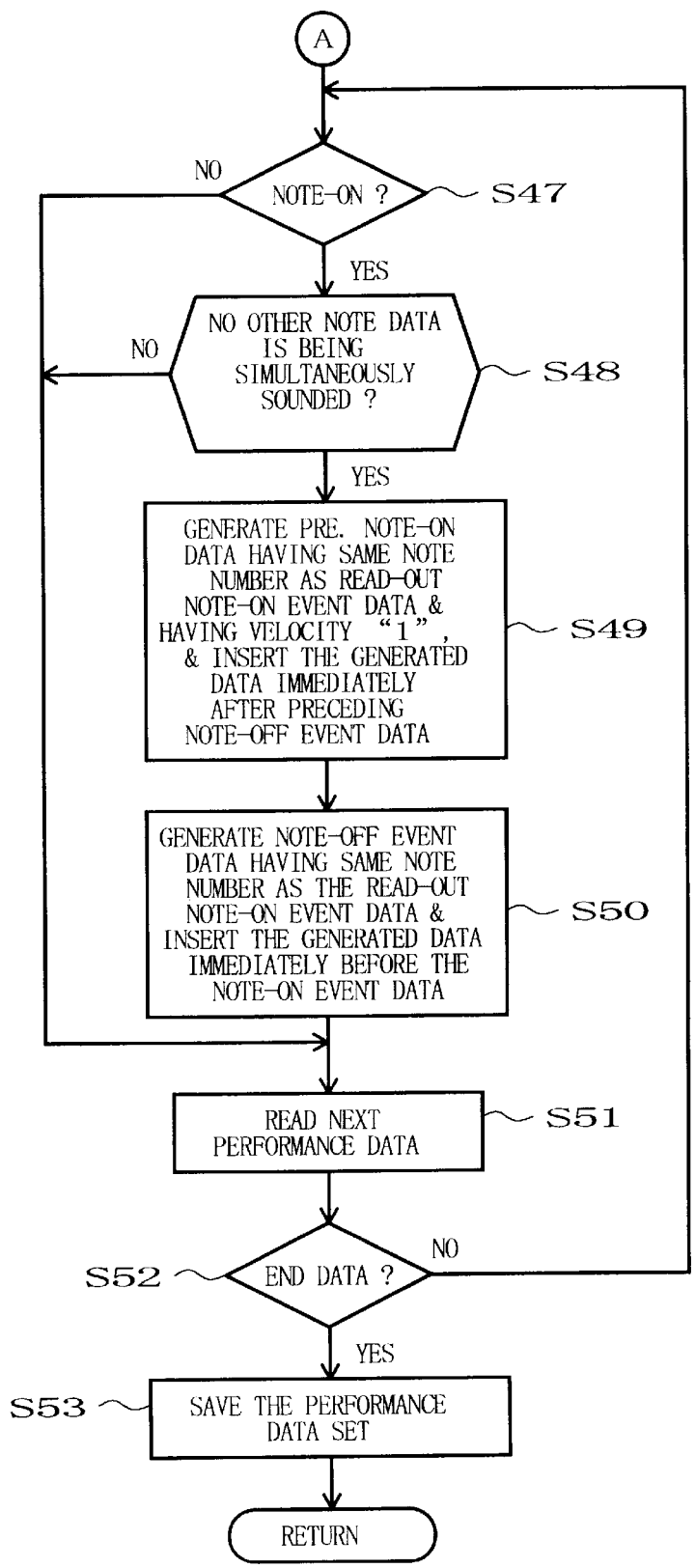

FIGS. 7A and 7B are a flowchart of a first preliminary note data generating process which automatically generates preliminary note data by reading in an original performance data set including only actual note-on data (i.e., note-on event data having an audible-level velocity value). Specifically, this preliminary note data generating process is carried out, in the external device as one of the other necessary operations at step S24 prior to an automatic performance, so as to automatically generate preannouncing note-on data corresponding to the scheme of FIG. 3A where one At of the LEDs is preliminarily lit for a period from release of a last-depressed key to key-on timing of a key to be next depressed.

Specifically, in FIGS. 7A and 7B, at step S40, a performance data set stored in a guide track of a performance data storage in the external device is loaded into a working area of a RAM provided in the external device. After that, the leading performance data in the loaded performance data set is read out at step S41, and a determination is made at next step S42 as to whether or not the read-out leading performance data is note-on event data. If the leading performance data is not note-on event data, reading of succeeding performance data is continued at step S43 until note-on event data is read out. Once note-on event data is read out as determined at step S42, the current process, at step S44, generates preannouncing note-on data having the same note number as the read-out note-on event data and a velocity value "1" and inserts the generated data at the beginning of the performance data set. Then, at step S45, the current process generates note-off event data having the same note number as the read-out note-on event data and inserts the generated note-off event data immediately before the note-on event data.

Then, next performance data is read out at step S46, and a determination is made at next step S47 as to whether or not the read-out performance data is note-on event data. If the next performance data is not note-on event data, reading of succeeding performance data is continued at step S51 until note-on event data is read out. Once note-on event data is read out as determined at step S47, the current process ascertains at step S48 whether there is any other note data being sounded simultaneously therewith. If no other note data is being simultaneously sounded as determined at step S48, then the current process, at step S49, generates preannouncing note-on data having the same note number as the read-out note-on event data and a velocity value "1" and inserts the generated preannouncing note-on data immediately after preceding note-off event data if any. Then, at step S50, the current process generates note-off data having the same note number as the read-out note-on event data and inserts the generated note-off event data immediately before the note-on event data.

Note that if there is other note data being simultaneously sounded as determined at step S48, it means that current key-on timing has arrived before release of a last-depressed key, so that no preannouncing note-on data is inserted. The above-noted operations of steps S47 to S51 are repeated until end data in the performance data set is read out. Once such end data is read out as determined at step S52, the first preliminary note data generating process is terminated after saving the performance data set in place of a previously-stored performance data set at step S53.

Figure 8A:
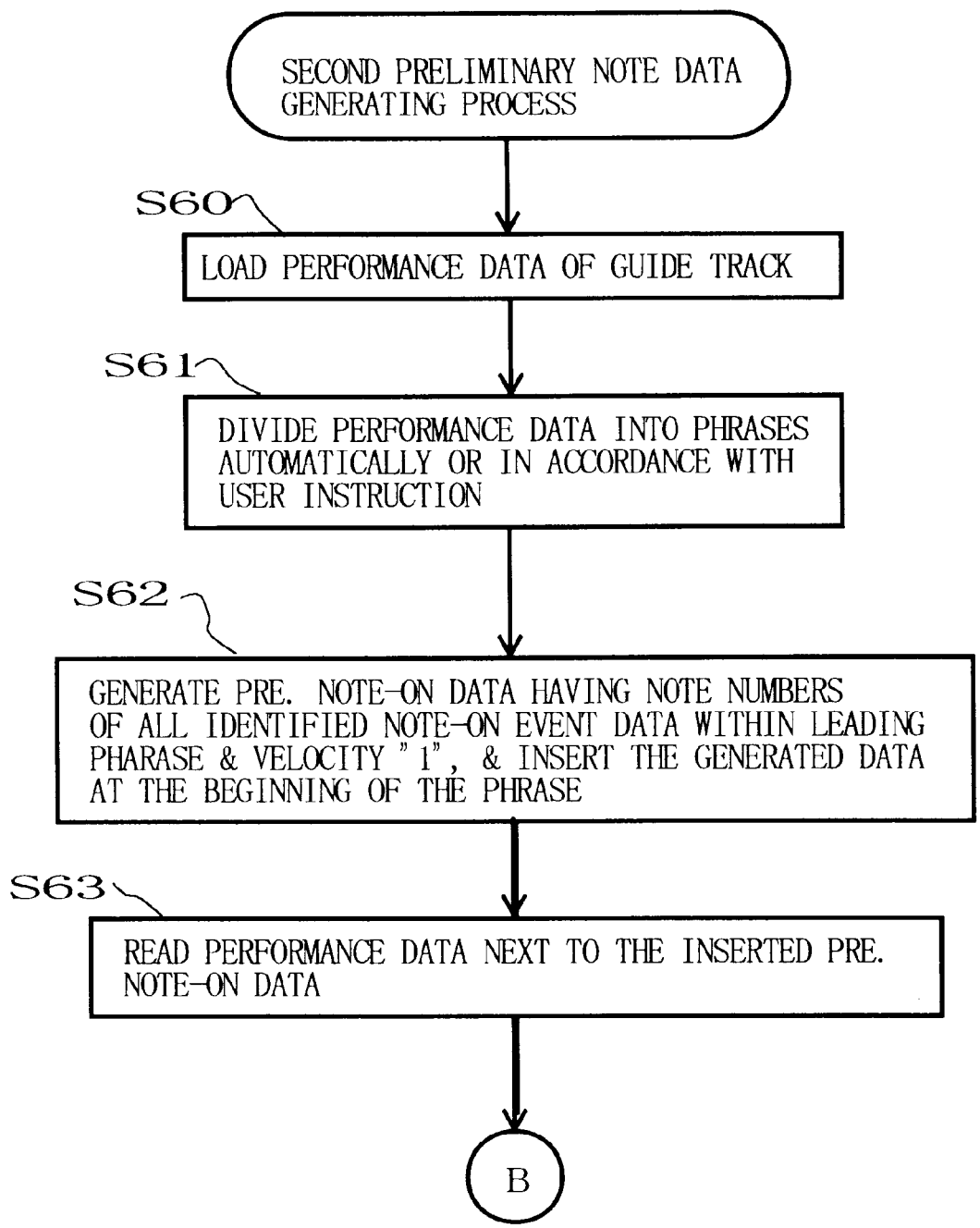
FIGS. 8A and 8B are portions of a flowchart showing another example of the preliminary note data generating process.
Figure 8B:
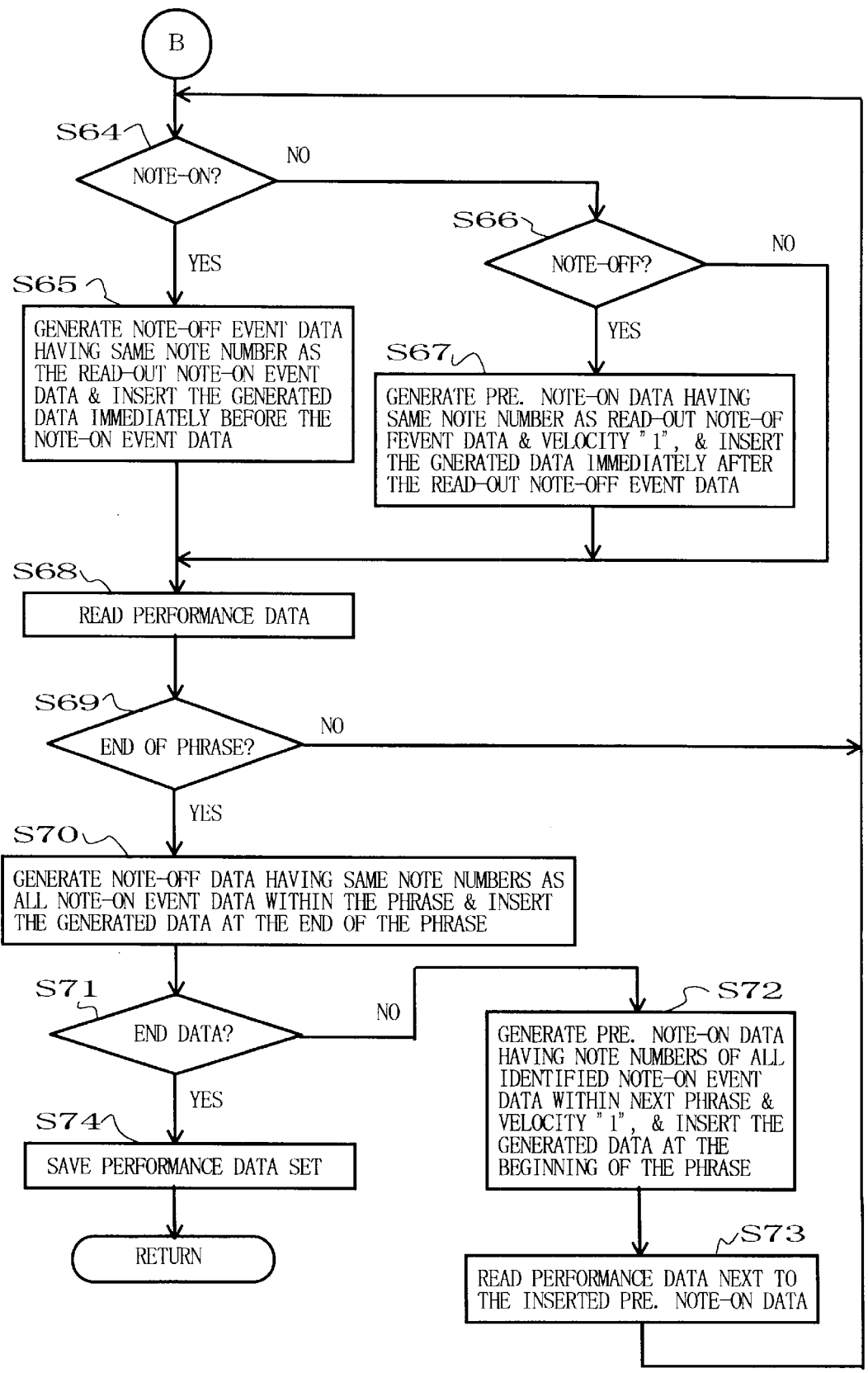

FIGS. 8A and 8B are a flowchart of a second preliminary note data generating process which automatically generates preannouncing note-on data by reading in a previously-stored performance data set only including actual note data. Specifically, this preliminary note data generating process is carried out, in the external device as one of the other operations at step S24 prior to an automatic performance, so as to automatically generates preannouncing note-on data corresponding to the scheme of FIG. 3B where, for each phrase, all the LEDs associated with the keys to be depressed within the phrase are preliminarily lit for key depression guide.

Specifically, in FIGS. 8A and 8B, at step S60, a performance data set stored in the guide track of the performance data storage area in the external device is loaded into the working area of the RAM provided in the external device. After that, the loaded performance data set is divided into a plurality of phrases at step S61, using any of the conventional methods such as the method based on analysis of the performance data set (see, for example, Japanese Patent Laid-open Publication No. HEI-8-292762) or the method based on designation of dividing points through user's switch operation. At next step S62, the current process identifies all note-on event data within a leading one of the resultant divided phrases so as to generate a plurality of preannouncing note-on data having note numbers of all the identified note-on event data within the phrase and all having a velocity value "1" and then insert these preannouncing note-on data at the beginning of the phrase.

Then, performance data next to the inserted preannouncing note-on data is read out at step S63, and a determination is made at next step S64 as to whether or not the next performance data is note-on event data. If so, the current process, at step S65, generates note-off event data having the same note number as the read-out note-on event data and inserts the generated note-off event data immediately before the note-on event data. If the next performance data is not note-on event data as determined at step S64, a determination is made at next step S66 as to whether or not the read-out next performance data is note-off event data. If the next performance data is note-off event data, the current process, at step S67, generates preannouncing note-on data having the same note number as the read-out note-off event data and a velocity value "1" and inserts the generated preannouncing note-on data immediately after the note-off event data. After that, or if the read-out data is neither note-on nor note-off event data, further next performance data is read out at step S68.

The above-noted operations of steps S64 to S68 are repeated until are repeated till the end of the phrase. Once the end of the phrase is reached as determined at step S69, the current process, at step S70, generates a plurality of note-off data having note numbers of all the identified note-on event data within the phrase and all having a velocity value "1" and then inserts the generated note-off event data at the end of the phrase. If the performance data read out at step S68 is not end data as determined at step S71, then the current process performs the above operations for the next phrase. Namely, at step S72, all note-on event data within the next phrase are identified so as to generate a plurality of preannouncing note-on data having note numbers of all the identified note-on event data within the phrase and all having a velocity value "1" and then insert these preannouncing note-on data at the beginning of the phrase. After that, performance data next to the inserted preannouncing note-on data is read out at step S73 and the above-noted operations at and after step S64 are repeated. Once performance data read out at step S68 is determined as end data at step S71, the second preliminary note data generating process is terminated after saving the performance data set.

Figure 9:
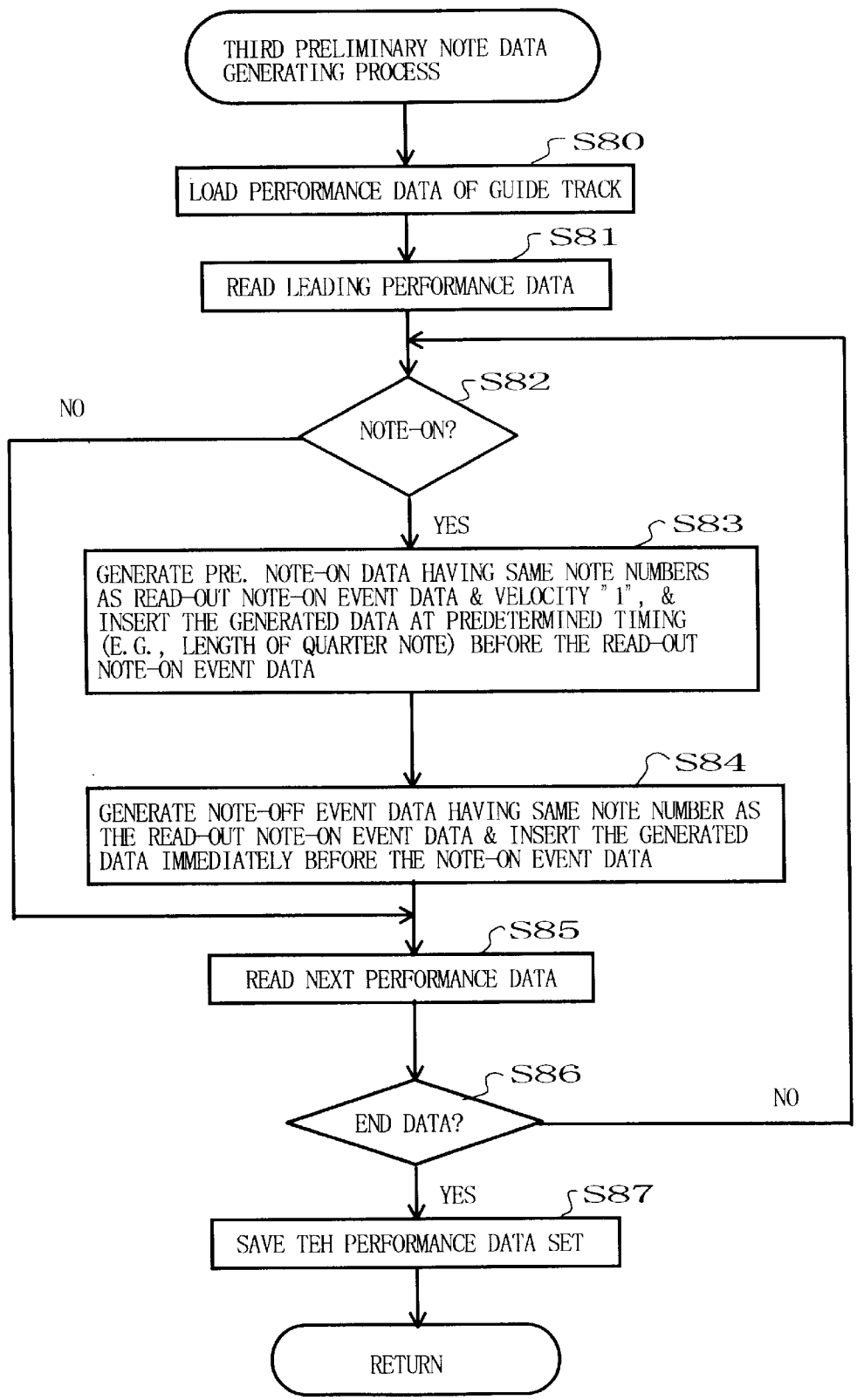
FIG. 9 is a flowchart showing still another example of the preliminary note data generating process.

FIG. 9 is a flowchart of a third preliminary note data generating process which automatically generates preannouncing note-on data by reading in an performance data set including only actual note-on data (i.e., note-on event data having an audible-level velocity value). Specifically, this preliminary note data generating process is carried out, in the external device as one of the other operations at step S24 prior to an automatic performance, so as to automatically generates preannouncing note-on data corresponding to the scheme where one of the LEDs associated with each key to be next depressed is preliminarily lit at predetermined timing before actual key-on timing of the key.

Specifically, in FIG. 9, at step S80, a performance data set stored in the guide track of the performance data storage in the external device is loaded into the working area of the RAM provided in the external device. After that, the leading performance data in the loaded performance data set is read out at step S81, and a determination is made at next step S82 as to whether or not the read-out leading performance data is note-on event data. If the leading performance data is note-on event data, the current process, at step S83, generates preannouncing note-on data having the same note number as the read-out note-on event data and a velocity value "1" and inserts the generated data at predetermined timing (e.g., at a quarter-note length) before the read-out note-on event data. The predetermined timing may be optionally set as desired by the user. The above-noted operations of steps S82 to S85 are repeated until end data of the performance data set is read out. Once the end data is read out as determined at step S86, the current third preliminary note data generating process is terminated after saving the performance data set at step S87.

The preliminary note data generating processes of FIGS. 7A to 9 have been described above as storing the performance data set including preannouncing note-on data as well as actual note-on data in place of the previously-stored performance data set including only actual note-on data. In an alternative, such a performance data set including preannouncing note-on data as well as actual note-on data may be stored separately from the previously-stored performance data set, rather than in place of the same.

Further, the preliminary note data generating processes of FIGS. 7A to 9 may be executed by the keyboard-type electronic musical instrument, rather than by the external device, so that the performance data set including preannouncing note-on data is reproduced in the musical instrument to provide the key depression guiding function. Further, a performance data set previously including preannouncing note-on data may be reproduced in the musical instrument to provide the key depression guiding function.

Furthermore, the preliminary note data generating processes of FIGS. 7A to 9 have been described above as processing a performance data set where data representing a note is managed separately as note-on event data and note-off event data. In an alternative, these processes may process a performance data set where data representing a note is managed collectively as note data (note number) and a gate time. Namely, the operations for generating note-off event data in FIGS. 7A to 9 may be replaced with other operations which identify, as a gate time, a time interval between note-on timing and corresponding note-off timing and imparts the identified gate time to the note-on event data.

Moreover, arrangements may be made to allow the player or user to optionally select any one of the processes of FIGS. 7A, 7B, 8A, 8B and 9 so that a performance can be carried out in a desired one of the key depression guiding schemes. Alternatively, these preliminary note data generating processes of FIGS. 7A to 9 may be executed in parallel in such a manner that the user can optionally select any one of performance data sets based on the different key depression guiding schemes.

It is also important to note that the present invention is applicable not only to an integrated keyboard-type electronic musical instrument as described so far but also to a discrete keyboard-type electronic musical instrument where discrete modules are connected such as via MIDI and/or network communication means. The present invention may also be implemented by a combined use of a personal computer and application program, in which case the application program may be stored in a recording medium such as a magnetic disk, optical disk and semiconductor memory and may be supplied to the personal computer directly or via a communication network.

Furthermore, an automatic performance tempo may be changed in any desired manner; for example, it may be changed by varying a tempo clock frequency, modifying a timing data value while maintaining a constant tempo clock frequency or varying a value used to count timing data per operation.

Moreover, the tone generator circuit may employ any of the conventionally-known tone generating methods, such as the waveform memory method, FM method, physical model method, harmonic synthesis method, formant synthesis method, and analog synthesizer method based on a combined use of VCO, VCF and VCA. The tone generator circuit may be implemented by a combination of a DSP and microprograms or may be implemented by software using a combination of a CPU and tone generating program, rather than by dedicated hardware. Where it is desired to provide a tone generator having a plurality of tone generating channels, only one tone generating circuit may be used on a time divisional basis, or a plurality of tone generating circuits may be provided in corresponding relations to the tone generating channels.

In summary, the musical performance guiding device according to the present invention is characterized in that the performance guiding display or indication is made in the first mode when the tone volume designating data included in the note data is of a value equal to or smaller than a predetermined value but is made in the second mode when the tone volume designating data is of a value greater than the predetermined value. With this arrangement, the player can know the level of the designated tone volume from the mode of the performance guiding indication and hence can properly vary the manner of the performance in advance. This arrangement significantly facilitates the player's performance.

The musical performance guiding device of the present invention is also characterized by dividing values of the tone volume designating data not greater than a predetermined value into a plurality of groups and changes a mode of the performance guiding indication depending on which of the groups the tone volume designating data included in the note data belongs to. Consequently, the performance guiding indication can be provided in a particular mode which properly fits the player's skill and hence is even kinder to the player.

The musical performance guiding device of the present invention is also characterized in that the above-mentioned predetermined value of the volume designating data is small enough to prevent generation of a signal of audible volume level. Thus, the note data of volume designating data not greater than the predetermined value can be used only for the performance guiding indication, and a complicated performance guide, such as preannouncing lighting, can be appropriately made through normal automatic performance operations. Further, even where such performance data is reproduced in a device having no particular performance guiding function, the device can work properly without any problems, because the performance data is in the same format as conventional performance data.

Further, the musical performance guiding device of the present invention is characterized by changing the mode of the performance guiding indication in response to guide mode setting information received from an external device. With this arrangement, the mode of the performance guiding indication can be changed via an external device as normal performance data and performance guiding data are received therefrom.

Furthermore, the musical performance guiding device of the present invention is characterized by automatically generating, from performance data containing only actual note data, preannouncing note-on data preceding actual note data. With this arrangement, conventional performance data prepared with no consideration of a performance guiding function into account can be used for performance guiding purposes.

What is claimed is:

1. A musical performance guiding device for making an indication as a guide for musical performance operation on the basis of note data including tone pitch designating data and tone volume controlling data, said musical performance guiding device comprising an indication mode control that performs control such that the indication is made in a first mode when the tone volume controlling data included in the note data is of a value equal to or smaller than a predetermined value but is made in a second mode when the tone volume controlling data is of a value greater than the predetermined value.

2. A musical performance guiding device as recited in claim 1 wherein said predetermined value of the tone volume controlling data is a relatively small value below an audible volume range of humans.

3. A musical performance guiding device for making an indication as a guide for musical performance operation on the basis of note data including tone pitch designating data and tone volume controlling data, said musical performance guiding device comprising an indication mode control that divides values of the tone volume controlling data not greater than a predetermined value into a plurality of value groups and changes a mode of the indication depending on which of the value groups the tone volume controlling data included in the note data belongs to.

4. A musical performance guiding device as recited in claim 3 wherein said predetermined value of the tone volume controlling data is a relatively small value below an audible volume range of humans.

5. A musical performance guiding device for making an indication as a guide for musical performance operation on the basis of note data including tone pitch designating data and tone volume controlling data, said musical performance guiding device comprising:

an information inputting unit that receives guide mode setting information; and an indication mode control that changes a mode of the indication in accordance with the guide mode setting information received by said information inputting unit.

6. A musical performance guiding device comprising:

a performance data supplying unit that supplies performance data including pairs of tone pitch designating data and tone volume controlling data;

an indicating unit that, on the basis of the performance data supplied via said performance data supplying unit, makes a performance guiding indication indicative of a tone pitch designated by the tone pitch designating data; and an indication mode control that performs control such that the performance guiding indication is made in a first mode when the tone volume controlling data included in the supplied performance data is of a value equal to or smaller than a predetermined value but is made in a second mode when the tone volume controlling data is of a value greater than the predetermined value.

7. A musical performance guiding device as recited in claim 6 which further comprises a tone generator that generates a tone on the basis of the supplied performance data, and wherein said predetermined value of the tone volume controlling data is a relatively small value below an audible volume range of humans.

8. A musical performance guiding device comprising:

a performance data supplying unit that supplies performance data including pairs of tone pitch designating data and tone volume controlling data;

an indicating unit that, on the basis of the performance data supplied via said performance data supplying unit, makes a performance guiding indication indicative of a tone pitch designated by the pitch designating data; and an indication mode control that divides values of the tone volume controlling data not greater than a predetermined value into a plurality of value groups and that, when the tone volume controlling data included in the performance data supplied via said performance data supplying unit is of a value not greater than the predetermined value, changes a mode of the performance guiding indication depending on a value group to which the tone volume controlling data included in the supplied performance data belongs.

9. A musical performance guiding device as recited in claim 8 which further comprises a tone generator that generates a tone on the basis of the supplied performance data, and wherein said predetermined value of the tone volume controlling data is a relatively small value below an audible volume range of humans.

10. A musical performance guiding device comprising:

a performance data supplying unit that supplies performance data including pairs of tone pitch designating data and tone volume controlling data;

an indicating unit that, on the basis of the performance data supplied via said performance data supplying unit, makes a performance guiding indication indicative of a pitch designated by the tone pitch designating data;

an information inputting unit that receives guide mode setting information for setting an optional guide mode from among a plurality of guide modes; and an indication mode control that changes a mode of the performance guiding indication in accordance with a combination of the guide mode set by the guide mode setting information and a value of the tone volume controlling data included in the supplied performance data.

11. A musical performance guiding method comprising the steps of:

making an indication as a guide for musical performance operation on the basis of note data including tone pitch designating data and tone volume controlling data, and changing a mode of the indication as a guide for musical performance operation in accordance with a value of the tone volume controlling data included in the note data.

12. A musical performance guiding method comprising the steps of:

supplying actual performance data including pairs of pitch data designating a pitch of a tone to be performed and tone volume controlling data of audible level;

supplying fake performance data including pairs of pitch data designating a pitch of a tone to be performed and tone volume controlling data of non-audible level, in advance of the actual performance data; and in response to the supplied fake performance data, making a preliminary indication as a guide for performance of the pitch designated by the pitch designating data of the fake performance data.

13. A musical performance guiding method as recited in claim 12 which further comprises the step of, in response to the supplied actual performance data, making an indication as a guide for manual performance of the pitch designated by the pitch data of the supplied fake performance data.

14. A musical performance guiding method comprising the steps of:

supplying a series of performance data that comprise actual performance data including pairs of pitch data designating a pitch of a tone to be performed and tone volume designating data of audible level designating a volume of the tone and fake performance data including pairs of pitch data designating a pitch of a predetermined performance tone and tone volume controlling data of non-audible level, wherein the fake performance data for the performance tone is supplied in advance of the actual performance data for the performance tone;

detecting that the tone volume controlling data included in the performance data is of a predetermined non-audible level, to thereby identify the performance data as the fake performance data; and in response to identification of the fake performance data, making a preliminary indication as a guide for performance of the pitch designated by the pitch data of the fake performance data.

15. A machine-readable recording medium containing a musical performance guiding program, said musical performance guiding program for causing a processor to execute the steps of:

making an indication as a guide for musical performance operation on the basis of note data including tone pitch designating data and tone volume controlling data; and changing a mode of the indication as a guide for musical performance operation in accordance with a value of the tone volume controlling data included in the note data.

16. A machine-readable recording medium containing a musical performance guiding program, said musical performance guiding program for causing a processor to execute the steps of:

actual performance data including pairs of pitch data designating a pitch of a tone to be performed and tone volume controlling data of audible level, in corresponding relation to predetermined performance timing;

supplying fake performance data including pairs of pitch data designating a pitch of a tone to be performed and tone volume controlling data of non-audible level, in advance of the actual performance data; and in response to the supplied fake performance data, making a preliminary indication as a guide for manual performance of the pitch designated by the pitch data of the fake performance data.

17. A machine-readable recording medium containing a musical performance guiding program, said musical performance guiding program for causing a processor to execute the steps of:

supplying a series of performance data that comprise actual performance data including pairs of pitch data designating a pitch of a tone to be performed and tone volume controlling data of audible level and fake performance data including pairs of pitch data designating a pitch of a predetermined performance tone and tone volume controlling data of non-audible level, wherein the fake performance data for the performance tone is supplied in advance of the actual performance data for the performance tone;

detecting that the tone volume controlling data included in the performance data is of a predetermined non-audible level, to thereby identify the performance data as the fake performance data; and in response to identification of the fake performance data, making a preliminary indication as a guide for performance of the pitch designated by the pitch data of the fake performance data.

18. A machine-readable recording medium containing performance data for a predetermined music piece, said performance data comprising actual performance data including pairs of pitch data designating a pitch of a tone to be performed and volume data of audible level designating a volume of the tone and fake performance data including pairs of pitch data designating a pitch of a predetermined performance tone and tone volume designating data of non-audible level, wherein the fake performance data for the predetermined tone is stored so as to be read out in advance of the actual data for the predetermined tone.

19. A machine-readable recording medium as recited in claim 18 wherein for every tone to be performed, the fake performance data is stored in corresponding relation to the actual performance data.

20. A machine-readable recording medium as recited in claim 18 wherein the fake performance data read out in advance of the actual performance data is used for a performance guiding indication, and any one of a plurality of predetermined values is allocated to the tone volume designating data of non-audible level included in the fake performance data so that the performance guiding indication is made in a specific mode differing depending on the allocated predetermined value.

21. A device for generating performance guiding data comprising a data generating unit that, on the basis of actual note data including tone volume designating data and tone pitch designating data to be used for sounding of a designated tone of audible level, generates preliminary note data preceding the actual note data to thereby produce performance data comprising a mixture of the actual note data and preliminary note data, said preliminary note data including tone volume designating data to be used for sounding of a tone.

22. A device as recited in claim 21 wherein said generating unit generates the preliminary note data corresponding to particular said actual note data, as note data for a section from a point immediately after an end of other said actual data preceding said particular actual note data to a point immediately before said particular actual note data.

23. A device as recited in claim 21 wherein said generating unit generates a plurality of the preliminary note data corresponding to all the actual note data supplied for a predetermined section, as note data for a starting position of the predetermined section.

24. A device as recited in claim 21 wherein said generating unit generates the preliminary note data corresponding to the actual note data, as note data for a section from a predetermined point before the actual note data to a point immediately before the actual note data.

25. A machine-readable recording medium containing a program for generating performance guiding data which, on the basis of actual note data including tone volume designating data and tone pitch designating data to be used for sounding of a designated tone of audible level, generates preliminary note data preceding the actual note data to thereby produce performance data comprising a mixture of the actual note data and preliminary note data, said preliminary note data including tone volume designating data to be used for sounding of a tone.

* * * * *